Dec. 4, 1928.  1,694,145
G. F. ROYER
MECHANICAL LOADING DEVICE
Filed April 28, 1926   3 Sheets-Sheet 1
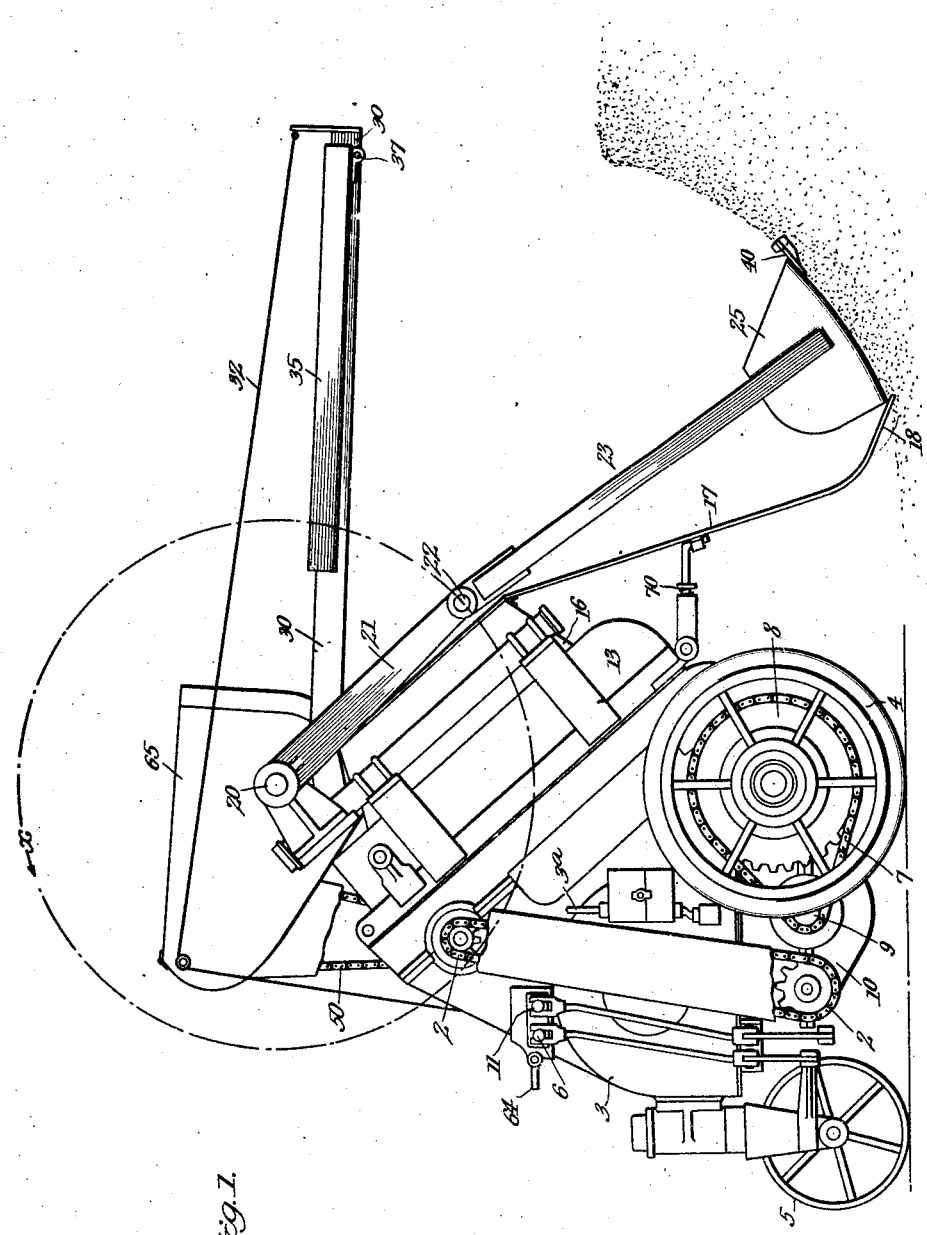
Inventor
George F. Royer.
By *[signature]*
Attorneys Dec. 4, 1928.
G. F. ROYER
1,694,145
MECHANICAL LOADING DEVICE
Filed April 28, 1926   3 Sheets-Sheet 2
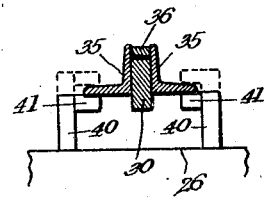
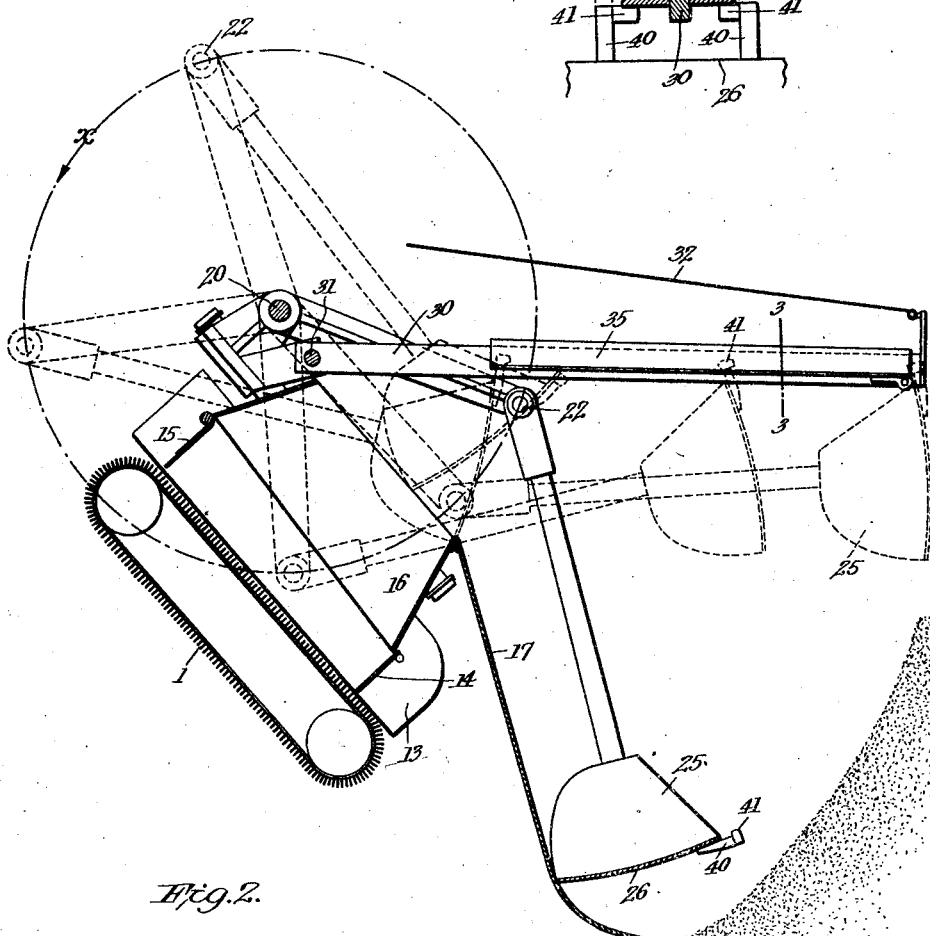
Inventor
George F. Royer, Dec. 4, 1928.　　　　　　　　　　　　　　　　　1,694,145
G. F. ROYER
MECHANICAL LOADING DEVICE
Filed April 28, 1926　　　3 Sheets-Sheet 3
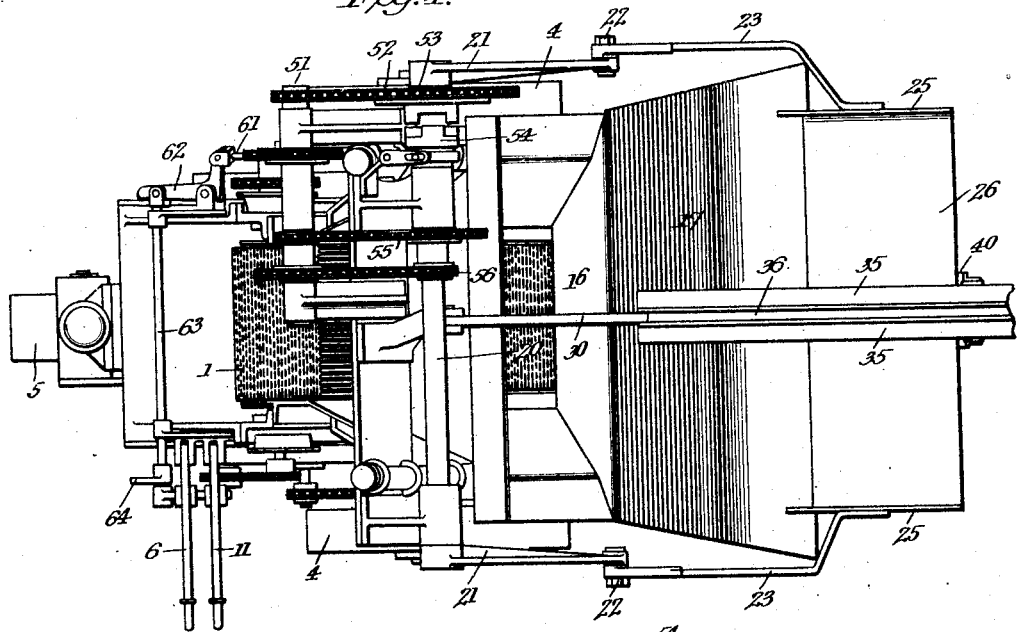
Fig. 4.
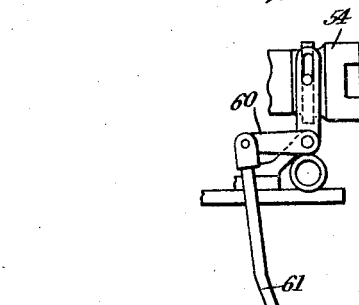
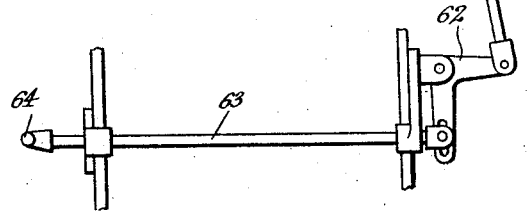
Fig. 5.
Inventor
George F. Royer.
By Cushman, Bryant & Darby
Attorneys Patented Dec. 4, 1928.

1,694,145

UNITED STATES PATENT OFFICE.

GEORGE F. ROYER, OF WILKES-BARRE, PENNSYLVANIA, ASSIGNOR TO ROYER FOUNDRY & MACHINE COMPANY, OF WILKES-BARRE, PENNSYLVANIA, A CORPORATION OF PENNSYLVANIA.

MECHANICAL LOADING DEVICE.

Application filed April 28, 1926. Serial No 105,184.

The present invention relates to improvements in mechanical loading devices, and is particularly designed for use in connection with machines employed in foundries for preparing, blending and cleaning molder's sand.

More especially the improvements are designed for use in connection with a machine of the type or character illustrated in my prior Patent No. 1,559,915, said mechanism being mounted upon a truck, whereby it may be readily moved from place to place upon a foundry floor.

In the drawings:—

Figure 1 is an elevation of one embodiment of the present invention.

Figure 2 is a diagrammatic view.

Figure 3 is a sectional detail on the line 3—3 of Figure 2.

Figure 4 is a plan.

Figure 5 is a detail.

As disclosed in said patent the sand treating machine with which the improved loading devices are shown as employed comprises essentially an endless belt 1, which is supported in an upwardly inclined position on a suitable truck frame and is driven at such speed that the particles collected thereon and delivered from the upper end thereof are discharged to a considerable distance from the machine so that said separated particles are thoroughly aerated.

In the accompanying drawing the separating belt 1, which may be of the character specifically disclosed by said patent is driven by suitable gearing and drive chain 2 from an electric motor enclosed by a casing positioned on the truck beneath the belt and current for actuating such motor is transmitted through a flexible conductor 3ª of such length as to permit relative free movement of the machine over a considerable area.

As shown, the material treating belt and motor are carried by a truck having traction wheels 4 adjacent one end and a steering wheel 5 by manipulating which the direction of movement of the truck, and means supported thereby, may be readily controlled.

As the means for moving the steering wheel 5 may be of various forms, it is not illustrated in detail but it will suffice to say that by manipulating a control lever or handle 6, the wheel 5 may be adjusted bodily about a vertical axis to vary the direction of movement of the truck as desired. Power is applied to the axle and traction wheels 4 through a sprocket chain 7 connecting a gear 8 with a sprocket 9 on a shaft which extends into a casing 10, depending from the floor of the truck and containing suitable gearing adapted to be connected with the motor by a suitable clutch, movement of which may be controlled through a hand lever 11.

When the switch controlling the motor is properly manipulated, the operator through movement of the clutch lever 11 can readily connect the traction wheels 4 with the motor and cause the machine to travel on the floor or surface upon which it stands, the direction of such movement being readily controlled by manipulation of the lever 6.

A suitable hopper is provided for laterally confining the mass of material deposited upon the endless separating belt 1, said hopper comprising lower side walls 13 and a lower end wall 14. Between the side walls 13 adjacent the upper, discharge, end of the separating belt, are positioned stop members 15, which, as explained in my aforesaid patent, prevent undesirable bodies from being carried out of the machine and deposited with the mass of separated particles. In the particular embodiment of the invention illustrated, the hopper is provided with an upper extension 16, which, as shown is of truncated form, being of greater area at its lower end than at its mouth or receiving end, so that any material supplied thereto will be delivered onto the operative surface of the separating belt 1. To the end wall of this portion 16 of the hopper adjacent the lower end of the separating belt is connected by a hinged joint, an apron 17, which extends downward and forward from the truck substantially into contact with the floor or surface on which the truck operates. The lower portion of said apron is curved or deflected forward slightly, as shown, to assist the material elevating means, hereinafter referred to, in transporting material from a pile to the hopper.

20 designates a power shaft which extends transversely of the belt being supported by suitable bearings connected with the frame that supports the hopper and drums of the separating belt. This shaft extends throughout the width of the machine, its ends projecting beyond the vertical planes of the traction wheels 4, and at its ends is provided with crank arms 21. The free ends of said parallel and radially projecting arms 21 are pivotally connected at 22 to arms or links 23, which extend rearward from the side walls of a scoop 25.

The scoop comprises the side or end walls from which the links or arms 23 extend and a transverse back plate or wall 26.

As the shaft 20 rotates the pivotal support, or connection 22 between the arms 21 and the scoop, will travel in a circular path indicated by the dotted circle $x$ in Figures 1 and 2, by which movement the scoop will be moved upward and rearward along the apron 17, and any material engaged thereby be delivered over the lower forward end wall of the hopper 16 and deposited on the separating belt 1 operating beneath such hopper.

In order that the scoop may properly engage with a pile of material arranged adjacent the lower end of the apron 17, means are provided, whereby in its movement from the hopper the scoop is caused to travel in a rectilineal path at an elevation from the truck and apron. Various means may be provided for thus causing the scoop to travel through an orbital path, which is of substantially triangular form, while its pivotal connection with the power shaft is moving through the circular path indicated by the dotted line $x$. As shown, a guide arm 30 pivotally supported at 31 extends forward from the truck above the apron 17 and scoop 25. By means of a suitable cable 32 attached to the free end of this arm and extending over guiding devices on the frame of the machine, the elevation or inclination of the guide arm may be varied as desired.

A track comprising two angle irons 35 connected by a spacer 36 embraces the guide 30, and is pivotally connected thereto as at 37. The transverse wall 26 of the scoop is provided with a pair of lugs 40, the free ends of which are offset as at 41, and these offset portions of the lugs are adapted to engage the horizontal flanges of the track 35 and slide longitudinally thereon during the movement of the scoop away from the machine hopper. By this arrangement the scoop in its movement outward from the hopper travels in a substantially horizontal plane, being supported by the track 35, and as the lugs 40 pass from engagement with said track flanges the scoop will fall, and the lower edges thereof enter the pile of material which is to be loaded, the scoop being drawn through said material into contact with the apron 17 and upward along said apron by the movement of the arms 21, 23, as the shaft 20 rotates. To cushion any blow from the scoop against the apron 17, the cushion member 70 is preferably arranged between the truck frame and the apron.

The parts are so related that shortly prior to the scoop reaching its highest elevation the lugs 40 thereon will contact with the lower faces of the horizontal flanges of the track 35, as represented in full lines in Figure 3, and as the upward movement of the scoop continues the track 35 will be rocked about its pivotal connection 37, so that the lugs 41 will pass above said horizontal flanges. As the downward movement of the arms 21 continues the lugs 41 will be brought into contact with the upper surfaces of the flanges of the track 35, as represented in dotted lines in Figure 3, and, as before noted, the scoop will be supported by said lugs and track flanges throughout the movement of the scoop away from the hopper and into position above the pile of material to be loaded.

Means are provided, whereby rotation of the shaft 20 may be readily controlled. As shown, a sprocket chain 50 transmits power from a sprocket on the driving shaft of the separator belt 1 to a sprocket on a shaft 51 mounted in suitable bearings above the separating belt. A chain 52 connects the sprocket on shaft 51 with a sprocket mounted to rotate about the axis of the shaft 20, and which is provided on its inner face with one member 53 of a suitable clutch. The companion clutch member 54 is keyed to a sleeve rotatable about the axis of shaft 20, and having thereon a sprocket which is connected by a chain 55 with an aligned sprocket rotating about the axis of sprocket 51, and through a sprocket chain 56 and suitable sprockets, the movement is transmitted to the shaft 20.

The connections provided by the sprocket chains 55, 56, and coacting sprockets constitute a reduced speed gearing intermediate of the clutch member 54 and the scoop actuating shaft 20.

Movement of the clutch member 54 into engaging relation with the clutch member 53 is effected by a bell crank 60 having one arm engaging the clutch member 54, and its other connected by a rod 61 with an arm of a second bell crank 62. A rod 63 provided at one end with a suitable handle 64 is provided for rocking the bell crank 62.

As shown in Figures 1 and 4, the handle 64 is located near the control levers 6 and 11, before referred to, so that all parts of the mechanism may be readily controlled by a single attendant.

The gearing intermediate the clutch member 53 and the scoop actuating shaft 20 may all be enclosed within a suitable housing 65, as shown in Figure 1, this housing being removed in Figure 4.

It will be understood that in the drawing many of the parts are shown more or less diagrammatically and conventionally, and there can, of course, be considerable variation in the details of the several trains of gearing and control means therefor without departing from the invention.

Also there can, of course, be modification of details and proportions of other parts of the mechanism and the drawings are to be considered as illustrative rather than restrictive of the invention, it being understood that except where the same are specifically referred to in the appended claims the invention is not to be understood as limited to the exact arrangement shown.

It is believed that the manner of using and advantages of the improvements will be readily understood and appreciated.

Power being supplied to the motor the attendant can readily cause the truck to move into a position where the lower end of the apron 17 will be adjacent a pile of material to be treated and by manipulation of the control lever 11 the motor and traction wheels can be disconnected so that while the machine is operating the truck will remain stationary.

By movement of the control handle 64 the scoop actuating power shaft 20 will be connected to the motor and at each rotation of such shaft the scoop will be positively moved through an orbital path substantially triangular in form, one side of which will be represented by the inclination of the apron 23 and a second side by the length of the track 35. The scoop will be caused to travel through this substantially triangular orbital path, while the pivotal connection thereof with the crank arms 21 of the actuating shaft 20 moves through the circular path represented by the dotted line $x$.

The material delivered onto the belt 1 will be treated as pointed out in my aforesaid patent, and the particles collected by such belt discharged from the upper end thereof and projected to a considerable distance from the machine.

The guide or support for the track 35 may be adjusted to various heights, and held at any desired elevation, depending upon the height of the pile of material which is to be loaded.

Having thus described the invention, what is claimed is:—

1. In an apparatus of the character described, the combination of a truck, a shaft supported in bearings on the truck and provided with two substantially parallel radially projecting arms, a scoop pivotally supported between said arms and projecting beyond the body of the truck, a guide arm projecting beyond the truck and over the scoop, means for rotating the shaft, whereby the pivotal support of the scoop will travel in a circular path, a track member extending longitudinally of the guide arm and pivotally connected thereto adjacent the free end of the arm, said track member extending into the path of the scoop as the latter is carried upward by rotation of the shaft, and means on the scoop engaging said track and causing the scoop to travel longitudinally thereof away from the truck during a portion of the circular movement of the pivotal support for the scoop.

2. In an apparatus of the character described, the combination of a truck, an apron hinged to a support on the truck and extending in an inclined direction downward substantially to the floor or surface on which the truck stands, a cushion member interposed between the body of the truck and said apron, a scoop, and means for moving the scoop in a path extending upward along the apron, then outward from the truck and apron to a position to engage a body of material adjacent the lower end of the apron and through said material into contact with the apron.

3. In an apparatus of the character described, the combination of a truck, a shaft supported in bearings on the truck and provided with two radially projecting arms, an apron extending in an inclined direction downward from the truck substantially to the level of the surface on which the truck stands, a guide extending beyond the adjacent end of the truck above the apron, a track supported by and projecting laterally from both sides of said guide, and a scoop connected to the arms on the shaft, whereby it will be moved in an orbital path extending upward along the apron and longitudinally of said guide as the shaft is rotated, and having means engaging and suspending the scoop from said laterally projecting track sections during its movement longitudinally of the guide.

4. In an apparatus of the character described, the combination of a truck, a shaft supported in bearings on the truck and provided with two radially projecting arms, an apron extending in an inclined direction downward from the truck substantially to the level of the surface on which the truck stands, a guide extending beyond the adjacent end of the truck above the apron, a track supported by and projecting laterally from both sides of said guide, and a scoop connected to the arms on the shaft whereby it will be moved in an orbital path extending upward along the apron and longitudinally of said guide as the shaft is rotated, the rear wall of the scoop being provided with lugs having offset terminals which engage the track while the scoop is moving longitudinally thereof.

In testimony whereof I have hereunto set my hand.

GEORGE F. ROYER.